(12) United States Patent
Yen et al.

(10) Patent No.: US 10,661,465 B2
(45) Date of Patent: May 26, 2020

(54) DISPLAY PANEL

(71) Applicant: InnoLux Corporation, Miao-Li County (TW)

(72) Inventors: Chung-Wen Yen, Miao-Li County (TW); Chao-Hsiang Wang, Miao-Li County (TW); Huan-Kuang Peng, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 455 days.

(21) Appl. No.: 15/488,980

(22) Filed: Apr. 17, 2017

(65) Prior Publication Data

US 2017/0320224 A1    Nov. 9, 2017

(30) Foreign Application Priority Data

May 4, 2016  (TW) .............................. 105113812 A

(51) Int. Cl.
| | | |
|---|---|---|
| *B26D 7/00* | (2006.01) | |
| *B25H 7/04* | (2006.01) | |
| *G02F 1/1333* | (2006.01) | |
| *G09F 9/33* | (2006.01) | |

(52) U.S. Cl.
CPC ............. *B26D 7/0006* (2013.01); *B25H 7/04* (2013.01); *G02F 1/133351* (2013.01); *G02F 2001/133357* (2013.01); *G09F 9/33* (2013.01)

(58) Field of Classification Search
CPC .................... B26D 7/0006; B25H 7/04; G02F 2001/133357; G02F 1/133351; G09F 9/33
See application file for complete search history.

(56) References Cited

U.S. PATENT DOCUMENTS

| | | | | |
|---|---|---|---|---|
| 647,339 A | * | 4/1900 | Thompson | G01B 3/56 33/1 N |
| D167,043 S | * | 6/1952 | Kintz | D10/64 |
| 4,382,590 A | * | 5/1983 | Pandya | B26B 29/06 269/288 |
| 4,458,133 A | * | 7/1984 | Macken | B29C 65/7473 219/121.67 |
| 4,490,916 A | * | 1/1985 | Blum | B43L 13/201 33/482 |
| 5,353,508 A | * | 10/1994 | Baker | A47G 27/0487 30/293 |
| 5,511,316 A | * | 4/1996 | Fischer | B26D 3/24 33/1 F |
| 5,577,328 A | * | 11/1996 | Kerry, Sr. | B43L 13/201 33/1 G |
| 5,865,928 A | * | 2/1999 | Lariviere, Jr. | A63F 9/10 156/256 |

(Continued)

*Primary Examiner* — Nimeshkumar D Patel
*Assistant Examiner* — Tania Courson
(74) *Attorney, Agent, or Firm* — McClure, Qualey & Rodack, LLP

(57) ABSTRACT

A display panel is provided. The display panel includes a substrate and a plurality of cutting rulers. The substrate includes a non-display area and a border surrounding the non-display area. The border includes at least one curved edge and at least one straight edge. The cutting rulers are disposed adjacent to the border. The numbers of the cutting rulers are determined according to the accuracy requirements and the shape of the display panel to meet various needs and improve productivity and product yield.

20 Claims, 9 Drawing Sheets

(56) References Cited

U.S. PATENT DOCUMENTS

| | | | |
|---|---|---|---|
| 6,216,354 B1 * | 4/2001 | Carbone | B43L 13/20 |
| | | | 33/27.01 |
| D448,406 S * | 9/2001 | Lariviere, Jr. | D10/64 |
| 6,321,457 B1 * | 11/2001 | Lariviere, Jr. | B26B 29/06 |
| | | | 33/562 |
| 6,802,927 B2 * | 10/2004 | Biegelsen | B23K 26/0661 |
| | | | 156/248 |
| 6,829,833 B2 * | 12/2004 | Langman | B43L 7/00 |
| | | | 33/32.2 |
| 7,290,471 B2 * | 11/2007 | Ehnes | B23B 27/20 |
| | | | 82/123 |
| 7,743,521 B2 * | 6/2010 | O'Morrow, Sr. | B43L 7/005 |
| | | | 33/417 |
| 8,029,708 B2 * | 10/2011 | Parker | F21V 5/00 |
| | | | 264/1.38 |
| 8,503,082 B2 * | 8/2013 | Ehnes | G02B 5/0221 |
| | | | 359/620 |
| 9,067,459 B2 * | 6/2015 | Bennet | B43L 13/001 |
| 9,594,205 B2 * | 3/2017 | Chung | G02B 6/0045 |
| 9,658,383 B2 * | 5/2017 | Chen | G02B 6/0061 |
| 10,035,277 B2 * | 7/2018 | Lipscomb | B26B 5/003 |
| D845,159 S * | 4/2019 | Yamauchi | D10/71 |
| 10,335,941 B2 * | 7/2019 | Heinz | B25H 7/04 |
| 2004/0123716 A1 * | 7/2004 | Durand | B23Q 9/0042 |
| | | | 83/743 |
| 2009/0151531 A1 * | 6/2009 | Levin | B26B 5/00 |
| | | | 83/565 |

* cited by examiner

DISPLAY PANEL

CROSS REFERENCE TO RELATED APPLICATIONS

This application claims priority of Taiwan Patent Application No. 105113812, filed on May 4, 2016, the entirety of which is incorporated by reference herein.

BACKGROUND

Technical Field

The present disclosure relates to an electronic component, and more particularly to an electronic display panel and a method for manufacturing the display panel.

Description of the Related Art

Electronic display devices are optoelectronic devices that are able to transfer electric signals into visible images so that users can see the information contained in the electronic signals. Recently, electronic display devices such as liquid-crystal displays and organic electro luminescence displays have grown in popularity.

Due to their slimness, low power consumption, and low radiation, these image-display devices have been widely used in portable electronic devices such as desktop computers, notebook computers, personal digital assistants (PDAs), and mobile phones, and are even gradually used to replace cathode ray tube (CRT) monitors and conventional TV sets.

To satisfy the various requirements of portable electronic products, manufacturers have to concern themselves with the external appearance of the products. For example, in order to adapt to a non-rectangular electronic device, the shape of the display panels have to be adjusted to correspond to the shape of the electronic device. However, how to examine whether the shape of the display panel meets the design standard and how to guarantee compatibility between the display panel and other elements of the electronic device are problems that still need to be solved.

SUMMARY

In accordance with some embodiments of the disclosure, a display panel is a one-cut cutting operation panel, which includes a first substrate and a plurality of cutting rulers. The first substrate includes a non-display area and a border surrounding the non-display area. The border includes N curved edges and M straight edges, and one of the N curved edges connects to one of the M straight edges. The cutting rulers are disposed adjacent to the border. The number (Num) of cutting rulers satisfies the following equation:

$$N + M \leq Num \leq N + 2M + \sum_{1 \to N} \left[ \left( \frac{\theta_n}{\tan^{-1}\left(\frac{A}{B}\right)} \right) + 1 \right] + V$$

wherein Num, N and M are positive integers; V is the number of inflection points on the border, and V is 0 or a positive integer; A is the maximum length of the first substrate measured along a first direction; B is the maximum length of the first substrate measured along a second direction that is perpendicular to the first direction; A and B respectively represent a length of two adjacent sides of a rectangle which encompasses the border of the first substrate; two diagonals of the rectangle crosses at a center of the first substrate; and $\theta_n$ is an angle formed by connecting two endpoints of an Nth curved edge to the center of the first substrate.

In accordance with some embodiments of the disclosure, a display panel is a multi-cut cutting operation panel, which includes a first substrate and a plurality of cutting rulers. The first substrate includes a non-display area and a border surrounding the non-display area. The border includes N curved edges and M straight edges, and one of the M straight edges does not connect with one of the N curved edges. The cutting rulers are disposed adjacent to the border. The number (Num) of cutting rulers satisfies the following equation:

$$2M - 1 \leq Num \leq N + 2M + \sum_{1 \to N} \left[ \left( \frac{\theta_n}{\tan^{-1}\left(\frac{A}{B}\right)} \right) + 1 \right] + V$$

wherein Num and N are positive integers; M is a positive integer larger than 3; V is the number of inflection points on the edge, and V is 0 or a positive integer; A is the maximum length of the first substrate measured along a first direction; B is the maximum length of the first substrate measured along a second direction that is perpendicular to the first direction; A and B respectively represent a length of two adjacent sides of a rectangle which encompasses the border of the first substrate; two diagonals of the rectangle crosses at a center of the first substrate; and $\theta n$ is an angle formed by connecting two endpoints of an Nth curved edge to the center of the first substrate.

In accordance with some embodiments of the disclosure, a display panel is a one-cut cutting operation panel or a multi-cut cutting operation panel, which includes a first substrate and a plurality of cutting rulers. The first substrate includes a non-display area and a border surrounding the non-display area. The border includes N curved edges. The cutting rulers are disposed adjacent to the border. The number (Num) of cutting rulers satisfies the following equation:

$$N \leq Num \leq N + \sum_{1 \to N} \left[ \left( \frac{\theta_n}{\tan^{-1}\left(\frac{A}{B}\right)} \right) + 1 \right] + V$$

wherein Num and N are positive integers; V is the number of inflection points on the edge, and V is 0 or a positive integer; A is the maximum length of the first substrate measured along a first direction; B is the maximum length of the first substrate measured along a second direction that is perpendicular to the first direction; A and B respectively represent a length of two adjacent sides of a rectangle which encompasses the border of the first substrate; two diagonals of the rectangle crosses at a center of the first substrate; and $\theta n$ is an angle formed by connecting two endpoints of an Nth curved edge to the center of the first substrate.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings.

DETAILED DESCRIPTION

Figure 1:
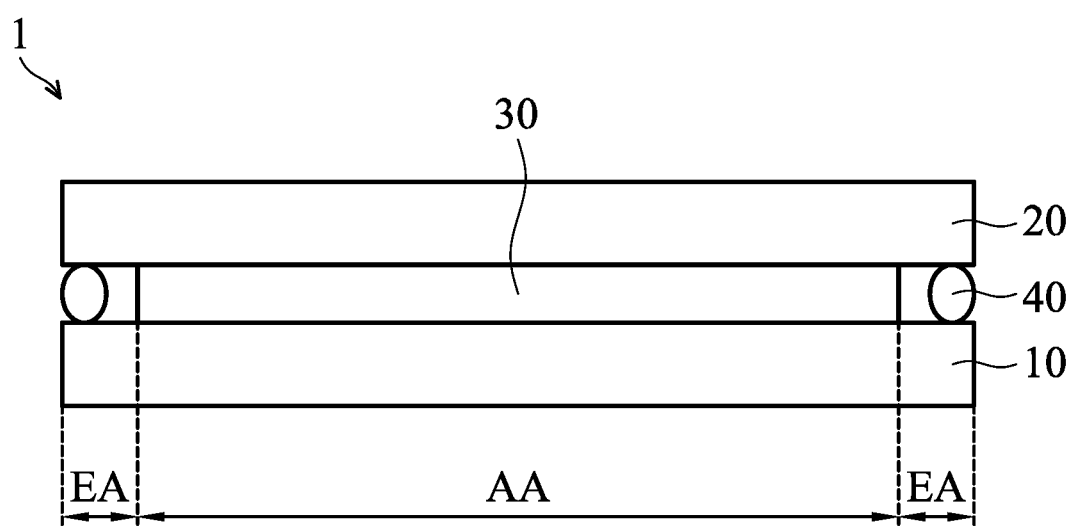
FIG. 1 is a cross-sectional view of the display panel in accordance with some embodiments of the present disclosure.

The display panel of the present disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to describe the present disclosure clearly. However, the use of like and/or corresponding numerals in the drawings of different embodiments does not suggest any correlation between different embodiments.

The description of the exemplary embodiments is in connection with the accompanying drawings, which are to be considered part of the entire written description. The drawings are not drawn to scale. In addition, structures and devices are shown schematically in order to simplify the drawing.

It should be noted that the elements or devices in the drawings of the present disclosure may be present in any form or configuration known to those with ordinary skill in the art. In this specification, directional expressions such as "a layer overlying another layer", "a layer is disposed above another layer", "a layer is disposed on another layer" and "a layer is disposed over another layer" may indicate not only that the layer directly contacts the other layer, but also that the layer does not directly contact the other layer, there being one or more intermediate layers disposed between the layer and the other layer.

In addition, in this specification, relative expressions are used. For example, "lower" or "bottom", and "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

It should be understood that, although the terms first, second, third etc. may be used herein to describe various elements, components, regions, layers, portions and/or sections, these elements, components, regions, layers, portions and/or sections should not be limited by these terms. These terms are used to distinguish one element, component, region, layer, portion or section from another region, layer or section. Thus, a first element, component, region, layer, portion or section discussed below could be termed a second element, component, region, layer, portion or section without departing from the teachings of the present disclosure.

FIG. 1 is a cross-sectional view of a display panel 1 in accordance with some embodiments of the present disclosure. The display panel 1 includes one or more substrates (for example, a first substrate 10 and a second substrate 20), a display layer 30 and an encapsulation adhesive 40 in accordance with some embodiments. The elements of the display panel 1 may appropriately be added or omitted, and the disclosure should not be limited by the embodiment. For example, an organic light-emitting diode (OLED) panel, where a thin film encapsulation is used, does not contain the encapsulation adhesive.

The display panel 1 may be a liquid-crystal panel, such as thin film transistor liquid-crystal panel. Alternatively, the display panel 1 may be a twisted nematic (TN) mode liquid-crystal panel, a vertical aligned (VA) mode liquid-crystal panel, an in-plane switching (IPS) mode liquid-crystal panel, a fringe field switching (FFS) mode liquid-crystal panel, a cholesteric mode liquid-crystal panel, a blue phase in-plane switching (IPS) mode liquid-crystal panel, or another suitable liquid-crystal panel. The display panel 1 may be an organic light-emitting diode (OLED) panel. Alternatively, the display panel 1 may be an inorganic light-emitting diode panel. Or, the display panel 1 may be a quantum dot (QD) display panel, wherein in the quantum dot may be disposed on the optical film, the color filter, or the light-emitting diode.

In some embodiments, the second substrate 20 is spaced apart from the first substrate 10 by a distance and at least covers a partial area of the first substrate 10. The display layer 30 is located between the first substrate 10 and the second substrate 20. The first substrate 10 may be a thin film transistor (TFT) substrate and include a plurality of pixels and switching elements and so on. The second substrate 20 may be a color filter substrate or a transparent cover substrate and optionally include electrode patterns, block matrix, or color filter elements and so on. The second substrate 20 may be equipped with touch functionality. The display layer 30 in LCD panel may include liquid crystal. The display layer 30 in OLED panel may include an organic light-emitting diode (OLED). Alternatively, the display layer 30 in micro-LED display may include an inorganic light-emitting diode. Furthermore, the first substrate 10 or the second substrate 20 may be a hard substrate or a flexible substrate. The hard substrate comprises glass, quartz, ceramic, or sapphire. The flexible substrate comprises PET, PI, or PC. However, the disclosure is not limited thereto.

The encapsulation adhesive 40 may include a sealant or a frit. The encapsulation adhesive 40 is located between the first substrate 10 and the second substrate 20, and surrounds the display layer 30. In some embodiments, the encapsulation adhesive 40 may be applied on the first substrate 10 (or the second substrate 20) along a rectangular path or a non-rectangular path, according to the edge shape of the first substrate 10 (or the second substrate 20) or the shape of the display area AA of the display panel 1. In other embodiments which are not shown in figures, the encapsulation adhesive 40 may be applied on any region which is located between the outer edge of the first substrate 10 and the display areas AA. In one embodiment, the display area AA may be the region where plural display elements are disposed, and the non-display area EA may be the region outside the display area AA. Or, the display area AA is adjacent to the non-display area EA.

Figure 2:
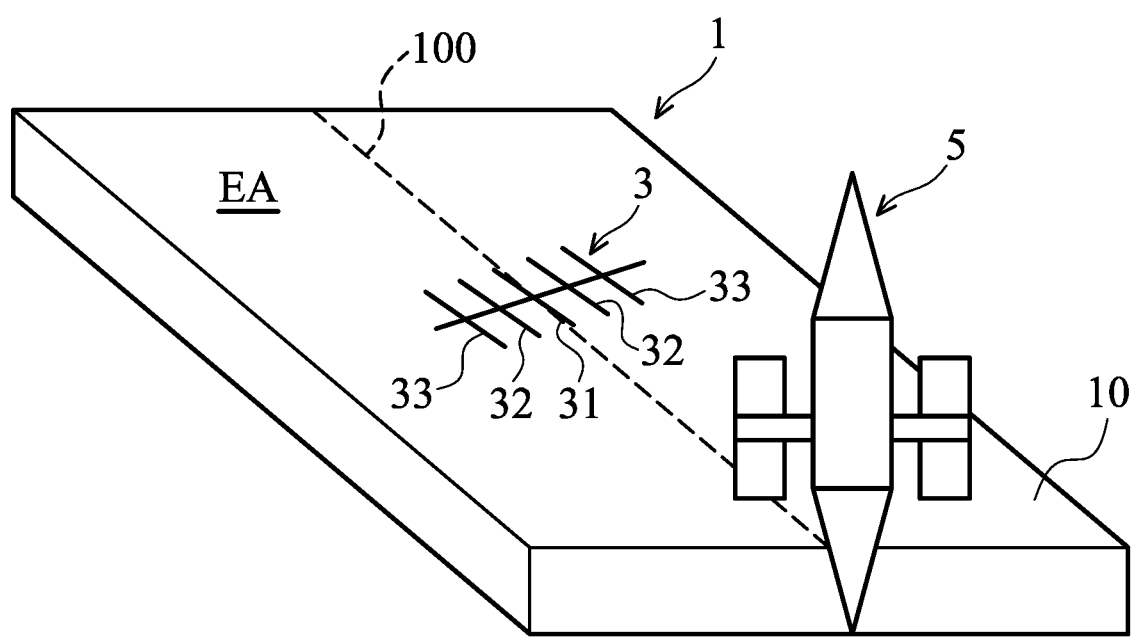
FIG. 2 is a schematic diagram showing a step of the method for manufacturing the display panel in accordance with some embodiments of the present disclosure.

FIG. 2 is a schematic diagram showing a step of the method for manufacturing the display panel 1 in accordance with some embodiments of the present disclosure. The method for manufacturing the display panel 1 may include using a cutting tool 5 to cut the display panel 1 along the border 100 of the display panel 1. The border 100 surrounds the non-display area EA. In order to make sure that the display panel 1 meets the design requirements after cutting, one or more cutting rulers 3 are disposed on the surface of the substrate (for example, the first substrate 10). In other words, the one or more cutting rulers 3 are disposed adjacent to the border 100. Taking the convenience of manufacturing into account, the cutting ruler 3 may be made through photolithography process and therefore is preferably disposed on the first substrate 10 which includes the display element. However, the cutting ruler 3 may be disposed on the second substrate 20. It should be understood that the second substrate 20 is omitted in the display panel 1 in FIG. 2 for simplicity.

In some embodiments, the cutting ruler 3 includes a plurality of straight segments that are arranged at predetermined intervals, such as one central straight segment 31, two first straight segments 32 and two second straight segments 33. The central straight segment 31 overlaps a predetermined position of the border 100 of the display panel 1. The two first straight segments 32 are respectively located on either side of the central straight segment 31. The two first straight segments 32 are spaced apart from the central straight segment 31 by a predetermined interval. The two second straight segments 33 are adjacent to the two first straight segments 32 respectively. The two second straight segments 33 are spaced apart from the central straight segment 31 by a farther distance than that of the two first straight segments 32. The two second straight segments 33 are spaced apart from the adjacent first straight segments 32 by a predetermined interval respectively. In some embodiments, the distance between the above central straight segment 31 and the first straight segment 32 equals to the distance between the first straight segments 32 and the second straight segment 33. In some embodiments, there may be scale values marked beside the first straight segments 32 and the second straight segment 33.

After the cutting of the display panel 1 is done, the border 100 of the display panel 1 is examined through an optical instrument (not shown), and the position of the border 100 is examined through the cutting ruler 3 to confirm whether the border of the display panel 1 complies with the standard requirements. For example, if a portion of the border 100 overlaps the central straight segment 31, it is determined that the portion of the border of the display panel 1 corresponding to the cutting ruler 3 meets the requirements concisely. If a portion of the border 100 is located between the second straight segment 33 and the central straight segment 31, it is also determined that the portion of the border of the display panel 1 corresponding to the cutting ruler 3 meets the requirements, since the error is within the acceptable manufacturing tolerance. If a portion of the border 100 is located outside the second straight segment 33, it is determined that the portion of the border of the display panel 1 corresponding to the cutting ruler 3 does not meet the requirements, since the error is too large. In some embodiments, although a portion of the border is located outside the second straight segment 33, the portion of the border is determined to meet the requirement.

The number of cutting rulers 3 may be adjusted according to the desired border accuracy of the display panel 1. As the number of cutting rulers 3 is increased, the multiple portions of the border of the display panel 1 may be examined to check whether they meet the requirements or not. However, in some embodiments, the cutting ruler 3 is made of low-impedance materials. In this case, too many cutting rulers 3 would have negative effects on the circuit of the display panel 1. For example, the static electricity accumulated on the cutting ruler may raise the risk of damaging the circuit of the display panel 1. How to determine the number of cutting rulers 3 is described in the following description. According to the different display panel cutting methods, the method where the cutting of the display panel may be completed at one time (one-cut cutting operation) and the method where multiple cuttings of the display panel are needed (multi-cut cutting operation) are described in detail respectively.

I. One-Cut Cutting Operation Panel

One-cut cutting operation panel, for example, may include the border having a curved edge. In this case, the curved edge includes one or more arcs which are connected with each other, and two adjacent arcs have the same tangential direction at the connecting point. The two arcs may be regarded as two portions of one curved edge. Alternatively, the one-cut cutting operation panel may include the panel having a straight edge and a curved edge. In this case, the straight edge is tangential to the curved edge at one of the points on the curved edge. Therefore, even if the path of the cutting tool 5 includes straight lines and curved lines, the cutting tool 5 is able to transfer from one path to another path smoothly without leaving zigzags on the cutting path because the straight line is tangential to the curved line.

In order to meet the basic requirements for border accuracy, in this type of the display panel, each curved edge of the substrate needs at least one cutting ruler to be adjacently disposed, and each straight edge of the substrate needs at least two cutting rulers to be adjacently disposed. Therefore, if a border includes N curved edges and M straight edges, then at least N+2M cutting rulers need to be disposed.

In this type of the display panel, the straight edge is cut before or after the curved edge is cut. The straight edge connects with a point on the curved edge, and the straight edge is tangential to the curved edge at the point on the curved edge. The cutting ruler adjacent to the curved edge may be regarded as one of the cutting rulers of the straight edge. Suppose that all straight edges are tangential to the adjacent curved edge, the minimum number (Num) of cutting rulers is:

$$N+(2-1)M=N+M \quad (1)$$

Figure 3:
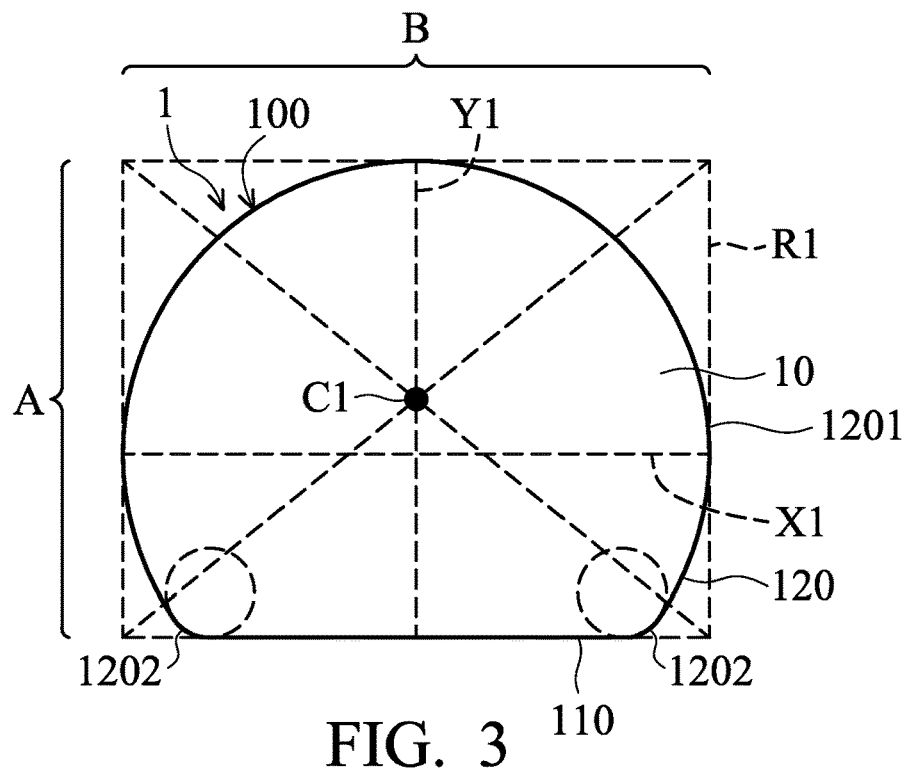
FIG. 3 is a schematic diagram showing the display panel in accordance with some embodiments of the present disclosure.

Take the display panel 1 shown in FIG. 3 as an example, the border 100 of the substrate 10 includes a curved edge 120 (N=1) and a straight edge 110 (M=1). The curved edge 120 includes an arc 1201 and two arcs 1202. The straight edge 110 is located on the same tangent line of the two arcs 1202. Thus, the cutting ruler adjacent to the curved edge 120 may be regarded as one of the cutting rulers of the straight edge 110. Under basic requirements for border accuracy, the number of cutting rulers should satisfy the above formula (1). The substrate 10 needs at least two cutting rulers to be disposed.

For the display panel with high requirements for border accuracy, at least one cutting ruler is disposed adjacent to each curved edge of the substrate. In addition, the curved edge has an angle with respect to the center of the substrate. The angle is defined as follows: connecting one of the endpoints of the curved edge to the center of the substrate and connecting another one of the endpoints of the curved edge to the center of the substrate; the two connecting lines intersecting at the center of the substrate and creating an angle therebetween; and such an angle is the angle of the curved edge. The "endpoint" in the disclosure is defined as a point on the curved edge at which the straight edge is tangential thereto. Except one basic cutting ruler is disposed adjacent to the curved edge, a cutting ruler is additionally disposed at each unit angle α (the selection of the unit angle α will be described below in detail). Moreover, a cutting ruler is additionally disposed adjacent to the inflection points of the curved edge. The "inflection point" in the disclosure is defined as a point on the curved edge at which the curved edge changes from being concave to convex, or vice versa. Therefore, if a substrate includes N curved edges, M straight edges and V inflection points, and each angle of the curved edge is $\theta_n$ respectively, then the maximum number (Num) of cutting rulers is:

$$N + 2M + \sum_{1 \to N} \left[ \left( \frac{\theta_n}{\alpha} \right) + 1 \right] + V \quad (2)$$

Figure 4:
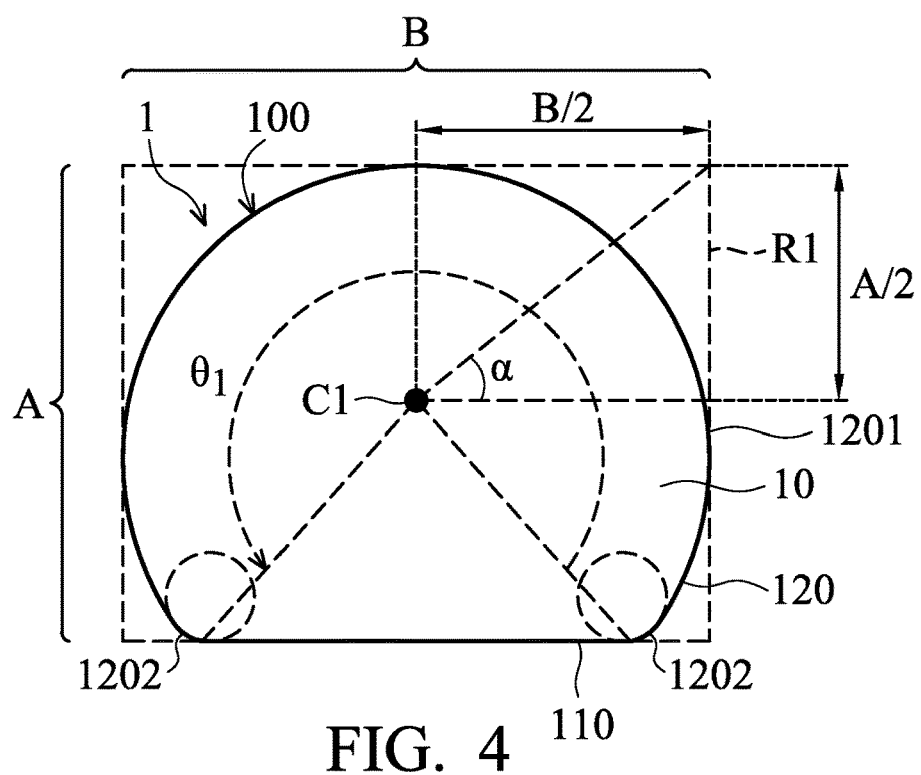
FIG. 4 is a schematic diagram showing the display panel in accordance with some embodiments of the present disclosure.

Take the display panel 1 shown in FIGS. 3 and 4 as an example, the substrate 10 includes a curved edge 120 (N=1) and a straight edge 110 (M=1). The curved edge 120 does not have an inflection point (V=0). The curved edge 120 has an angle $\theta_1$ with respect to the center C1 of the substrate 10. The center C1 of the substrate 10 is determined by the following method. First, select an axis of symmetry Y1 of the substrate 10. The substrate 10 has the maximum length A along a direction parallel to the axis of symmetry Y1. Next, select the axis X1 along which the substrate has the maximum length B and is perpendicular to the axis of symmetry Y1 and is through the substrate 10. Next, a rectangle R1 is made which may encompass the substrate 10 therewithin. The rectangle R1 includes two adjacent sides respectively having the maximum length A and the maximum length B. The diagonals of the rectangle R1 intersect at a point, and the point is the center C1 of the substrate 10. Further, the axis of symmetry Y1 crosses the center of the substrate.

In addition, the unit angle α in formula (2) is the angle between the diagonal of rectangle R1 and the segment which is parallel to the axis X1 and passes through the center C1 of the substrate 10. As shown in FIG. 4, there is an angle α between the diagonal of rectangle R1 and the segment parallel to the axis X1 and passing through the center C1 of the substrate 10. The angle α is the unit angle and its value equals to $\tan^{-}(A/B)$. Thus, under high requirements for border accuracy, the maximum number of cutting rulers satisfies the above formula (2). If the angle $\theta_1$ of the curved edge 120 is 300 degrees and the unit angle α is 40 degrees, then up to 11 cutting rulers may be disposed on the display panel 1.

Figure 5:
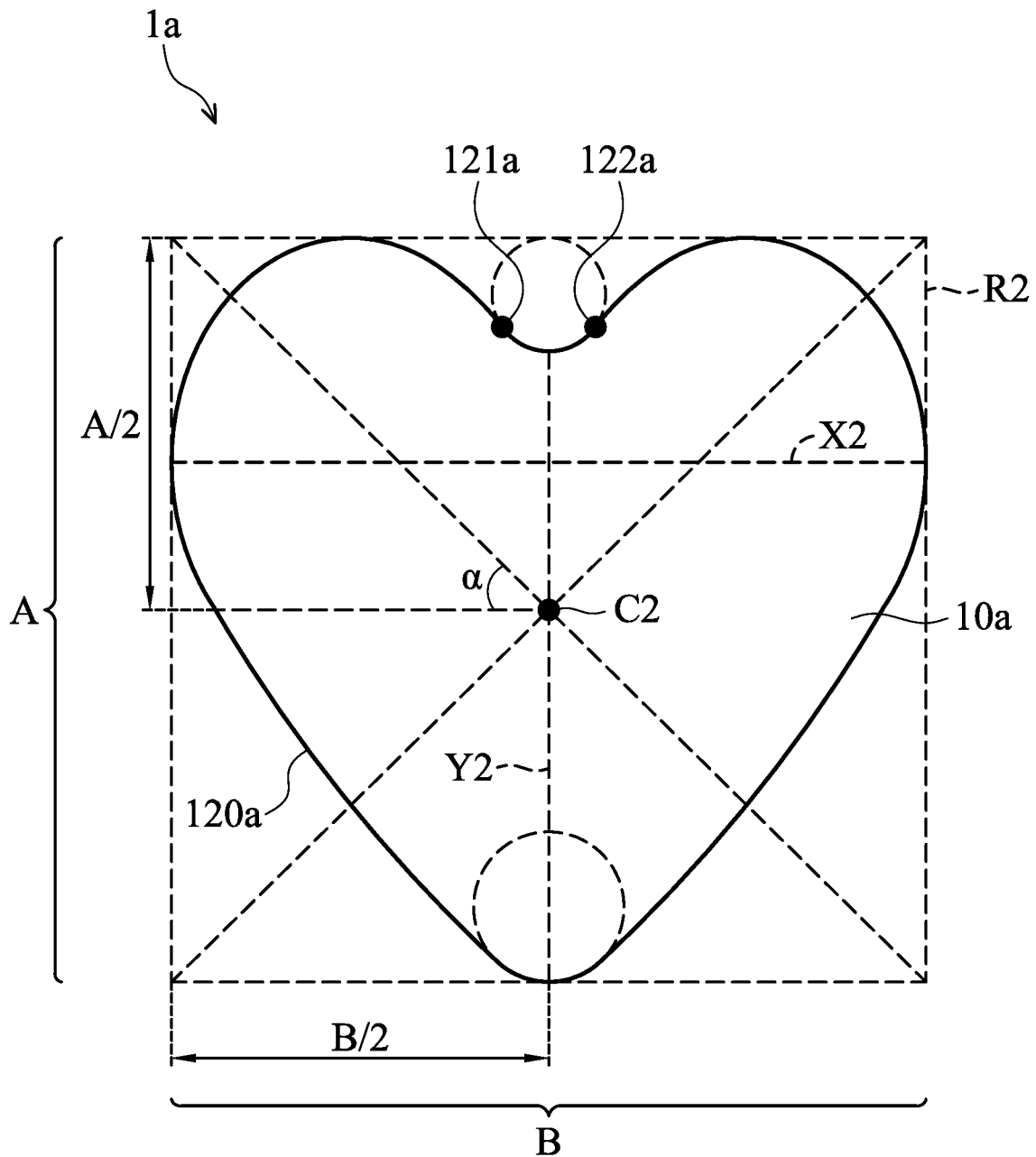
FIG. 5 is a schematic diagram showing the display panel in accordance with some embodiments of the present disclosure.

FIG. 5 is a schematic diagram showing the display panel 1a in accordance with some embodiments of the present disclosure. In this embodiment, the substrate 10a of the display panel 1a only includes a curved edge 120a (N=1) and does not have a straight edge (M=0). The curved edge 120a includes two inflection points 121a and 122a (V=2). The curved edge 120a has an angle 360 degrees with respect to the center C2 of the substrate 10a.

The display panel 1a is a one-cut cutting operation panel, which applies to formula (1) and formula (2). However, since the display panel 1 does not have a straight edge, formula (1) and formula (2) are respectively revised as follows:

$$N \quad (1')$$

$$N + \sum_{1 \to N} \left[ \left( \frac{\theta_n}{\alpha} \right) + 1 \right] + V \quad (2')$$

Therefore, under basic requirements for border accuracy, the number of cutting rulers satisfies the above formula (1'). The display panel 1a needs at least one cutting ruler to be disposed. Under high requirements for border accuracy, the maximum number of cutting rulers satisfies the above formula (2'). If the angle $\theta_1$ of the curved edge 120 is 360 degrees and the unit angle α is 45 degrees, then up to 12 cutting rulers may be disposed on the display panel 1a.

II. Multi-Cut Cutting Operation Panel

Multi-cut cutting operation panel, for example, may include the panel having the straight edge and the curved edge. In this case, at least one straight edge does not connect to the tangential point of the curved edge, and at least one straight edge is not tangential to the curved edge or two endpoints of at least one straight edge does not connect to any curved edge. Alternatively, multi-cut cutting operation panel may include the panel having the curved edge. The curved edge consists of a number of arcs, and at least two adjacent arcs have different tangential directions at the connecting point.

In order to meet the basic requirements for border accuracy, in this type of the display panel, each curved edge of the substrate needs at least one cutting ruler to be adjacently disposed, and each straight edge of the substrate needs at least two cutting rulers to be adjacently disposed. Therefore, if a substrate includes N curved edges and M straight edges, then at least N+2M cutting rulers need to be disposed.

However, if the straight edge is cut before or after the curved edge is cut, the straight edge connects with a point of the curved edge, and the straight edge is tangential to the curved edge at the point on the curved edge. In this case, the cutting ruler adjacent to the curved edge may be regarded as one of the cutting rulers adjacent to the straight edge. Suppose that the number of straight edges connecting to the curved edge is N+1, and the number of straight edges not connecting to the curved edge is M−(N+1). Then, the minimum number (Num) of cutting rulers is:

$$N+(N+1)*(2-1)+[M-(N+1)]*2=2M-1 \quad (3)$$

Figure 6:
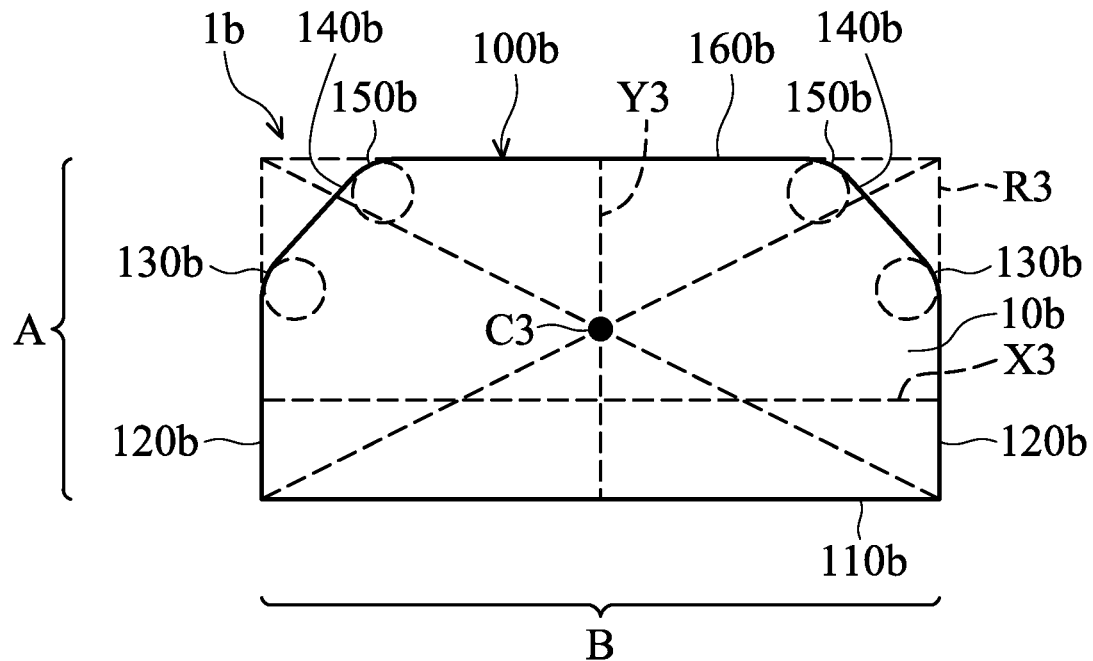
FIG. 6 is a schematic diagram showing the display panel in accordance with some embodiments of the present disclosure.

Take the display panel 1b shown in FIG. 6 as an example: the border 100b of the substrate 10b includes four curved edges (two curved edges 130b and two curved edges 150b; N=4) and six straight edges 110 (one straight edge 110b, two straight edges 120b, two straight edges 140b and one straight edge 160b; M=6). The straight edges 120b, 140b and 160b all are tangential to their adjacent curved edges 130b and 150b. Thus, the cutting rulers adjacent to the curved edges 130b and 150b may be regarded as one of the cutting rulers of the straight edges 120b, 140b and 160b. However, the straight edge 110b is not parallel with two straight edges 120b. Therefore, the straight edge 110b needs two cutting rulers to be adjacently disposed individually. Under basic requirements for border accuracy, the number of cutting rulers satisfies the above formula (3). The number of straight edge connecting to the curved edge is 5, and the number of straight edge not connecting to the curved edge is 1. Thus, the display panel 1b needs at least eleven cutting rulers to be disposed.

For the display panel with high requirements for border accuracy, at least one cutting ruler is disposed adjacent to each curved edge of the substrate. Moreover, a cutting ruler is additionally disposed at each unit angle α according to an angle of the curved edge with respect to the center of the substrate (the selection of the unit angle α will be described below in detail). Furthermore, additionally dispose a cutting ruler when passing through each inflection point. Thus, if a display panel includes N curved edges, M straight edges and V inflection points, and each angle of the curved edge is $\theta_n$ respectively. The angle is defined as follows: connecting one of the endpoints of the curved edge to the center of the substrate and connecting another one of the endpoints of the curved edge to the center of the substrate; the two connecting lines intersecting at the center of the substrate and creating an angle therebetween; and such an angle is the angle of the curved edge. The maximum number (Num) of cutting rulers is:

$$N + 2M + \sum_{1 \to N} \left[\left(\frac{\theta_n}{\alpha}\right) + 1\right] + V \quad (4)$$

Take the display panel 1b shown in FIG. 6 as an example, the substrate 10b includes four curved edges (N=4) and six straight edges (M=6). The curved edges 130b and 150b do not have an inflection point (V=0). The center C3 of the substrate 10b is determined by the following method. First, select an axis of symmetry Y3 of the panel. The display panel 1b has the maximum length A along a direction parallel to the axis of symmetry Y3. Next, select the axis X3 along which the display panel 1b has the maximum length B and is perpendicular to the axis of symmetry Y3 and is through the display panel 1b. Next, make a rectangle R3 which may encompass the display panel 1b therewithin. The rectangle R3 includes two adjacent sides respectively having the maximum length A and the maximum length B. The diagonals of the rectangle R3 intersect at a point, and the point is the center C3 of the substrate 10b of the display panel 1b.

Figure 7:
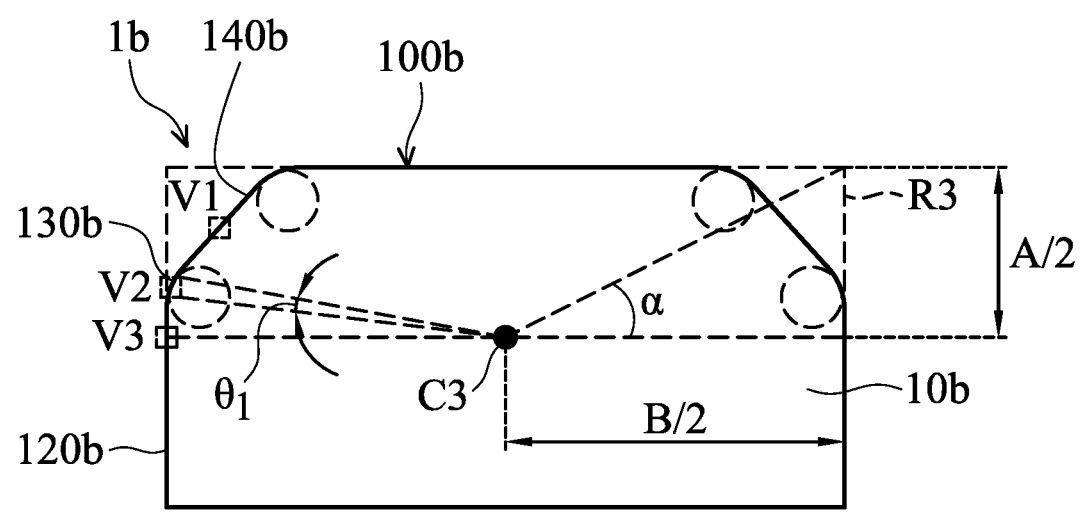
FIG. 7 is a schematic diagram showing the display panel in accordance with some embodiments of the present disclosure.

In addition, the unit angle α in formula (4) is the angle between the diagonal of rectangle R3 and the segment which is parallel to the axis X3 and passes through the center C3 of the substrate 10b. As shown in FIG. 7, there is an angle α between the diagonal of rectangle R3 and the segment parallel to the axis X3 and passing through the center C3 of the substrate 10b. The angle α is the unit angle and its value equals to $\tan^{-1}(A/B)$. Thus, under high requirements for border accuracy, the maximum number of cutting rulers satisfies the above formula (4). The angles of the curved edges 130b and 150b with respect to the center C3 of the substrate 10b clockwise are $\theta_1$, $\theta_2$, $\theta_3$ and $\theta_4$, respectively (FIG. 7 only depicts $\theta_1$). $\theta_1$, $\theta_2$, $\theta_3$ and $\theta_4$ are assumed to be 22.5 degrees respectively, and the unit angle α is 30 degrees. In this case, up to 23 cutting rulers may be disposed on the display panel 1b.

It should be understood that, in this embodiment, the connecting line between one endpoint of the curved edge and the center C3 of the substrate and the connecting line between another endpoint of the curved edge and the center C3 of the substrate intersect at the center C3 of the substrate. The angle between these two connecting lines is the angle. The two endpoints of the curved edge are respectively located at the points where the curved edge and the straight edge connect. The connecting point is preferably, but is not limited thereto, a tangential point where the straight edge is tangential to the curved edge.

In accordance with other embodiments, the substrate of the display panel only includes N curved edges (N>1) and V inflection points. It should be understood that the difference between this embodiment and the one-cut cutting operation panel is that the two adjacent curved edges have different tangent line directions at the connecting points in the present embodiment. Since the display panel does not have a straight edge (M=0), formula (3) and formula (4) are respectively revised as follows:

$$N \quad (3')$$

$$N + \sum_{1 \to N} \left[\left(\frac{\theta_n}{\alpha}\right) + 1\right] + V \quad (4')$$

Figure 8:
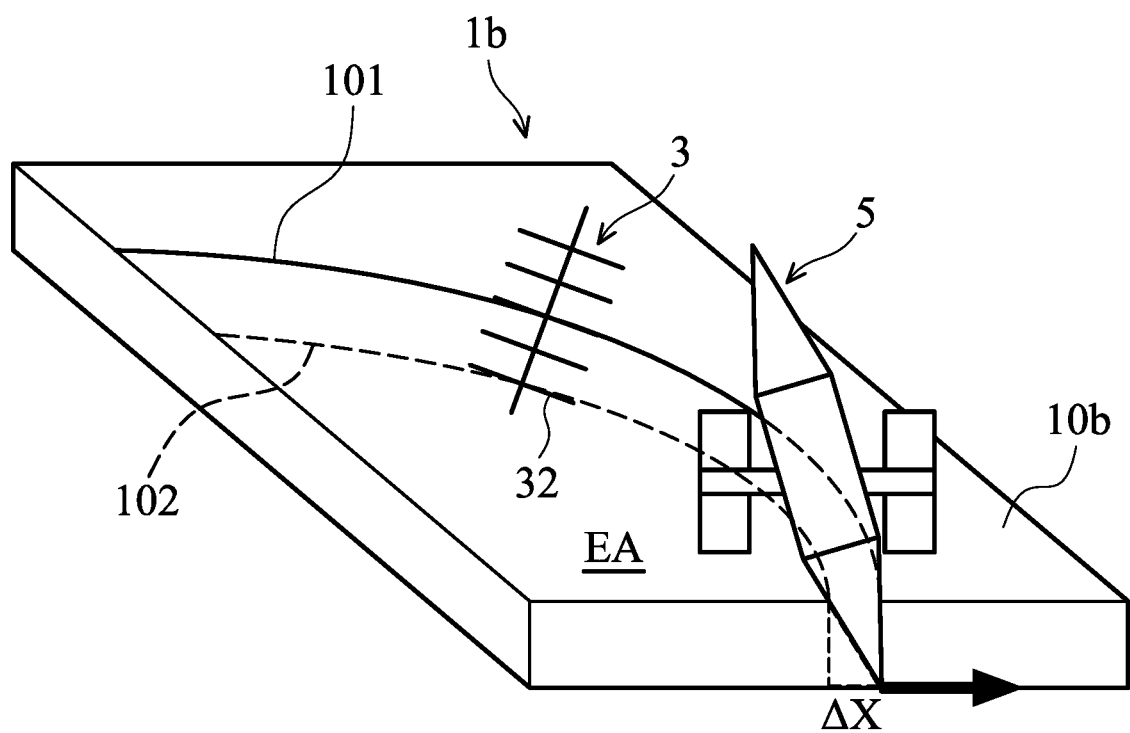
FIG. 8 is a schematic diagram showing a step of the method for manufacturing the display panel in accordance with some embodiments of the present disclosure.

FIG. 8 is a schematic diagram showing a step of the method for manufacturing the display panel 1b (the second substrate 20 is omitted in the figure) in accordance with some embodiments of the present disclosure. In some embodiments, since the cutting tool 5 cuts the display panel 1b with a slanted angle to create the curved edge, there is a distance difference ΔX between the upper edge 101 and the lower edge 102 of the substrate 10b. In order to allow the lower edge 102 of the substrate 10b which corresponds to the curved edge to meet the standard, the upper edge 101 of the curved edge will be closer to the non-display area EA of the substrate 10b than the adjacent straight edge.

Figure 9A:
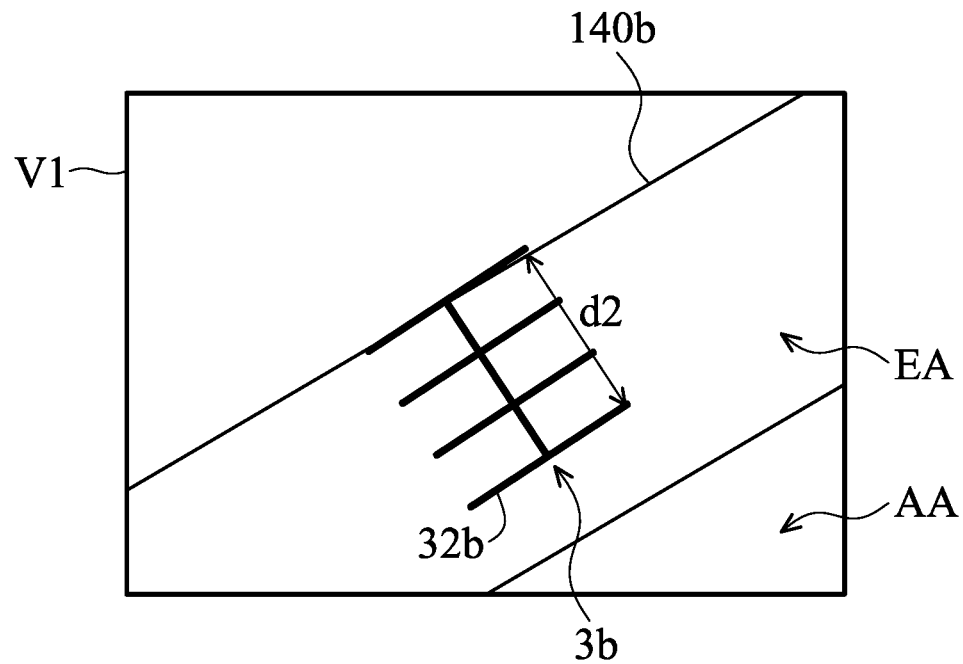
FIGS. 9A, 9B and 9C are enlarged figures showing regions V1, V2 and V3 in FIG. 7 respectively.
Figure 9B:
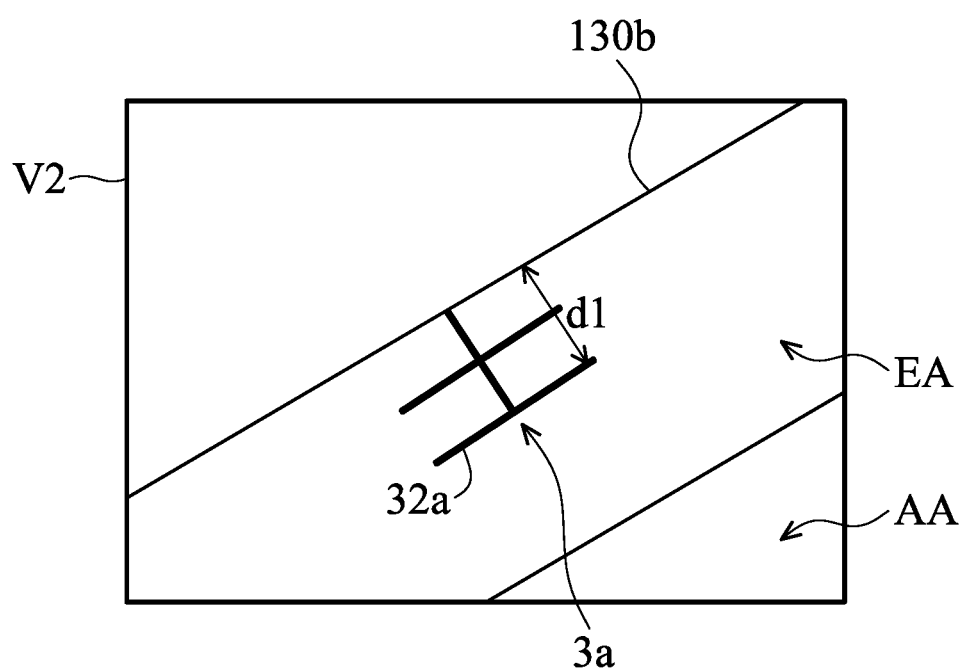
Figure 9C:
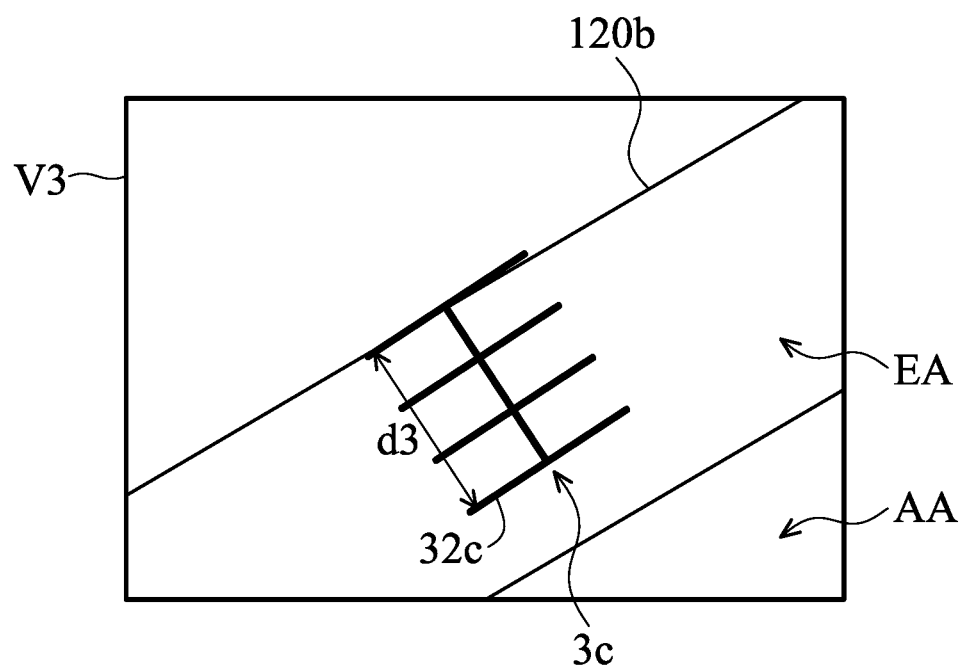

FIGS. 9A, 9B and 9C are enlarged figures showing regions V1, V2 and V3 in FIG. 7 respectively. The first cutting ruler 3a is disposed adjacent to the curved edge 130b. The first cutting ruler 3a includes a first straight segment 32a that is farthest from the curved edge 130b. The first straight segment 32a spaces apart the curved edge 130b by a minimum distance d1 (FIG. 9B). In other words, the minimum distance d1 between the first straight segment 32a and the curved edge 130b is defined as a first distance. The second cutting ruler 3b is disposed adjacent to the straight edge 140b. The second cutting ruler 3b includes a second straight segment 32b that is farthest from the curved edge 140b. The second straight segment 32b spaces apart the straight edge 140b by a minimum distance d2 (FIG. 9A). In other words, the minimum distance d2 between the second straight segment 32b and the straight edge 140b is defined as a second distance. The third cutting ruler 3c is disposed adjacent to the straight edge 120b. The third cutting ruler 3c includes a third straight segment 32c that is farthest from the straight edge 120b. The third straight segment 32c spaces apart the straight edge 120b by a minimum distance d3 (FIG. 9C). The minimum distance d1 is less than the minimum distance d2 or the minimum distance d1 is less than the minimum distance d3. The word "disposed adjacent to" means that the cutting ruler is disposed adjacent to its corresponding edge to determine whether its corresponding edge meets the basic requirements for border accuracy. A cutting ruler is disposed adjacent to an edge includes a first type that the cutting ruler is overlapped with the edge or a second type that the cutting ruler is not overlapped with the edge.

Figure 10:
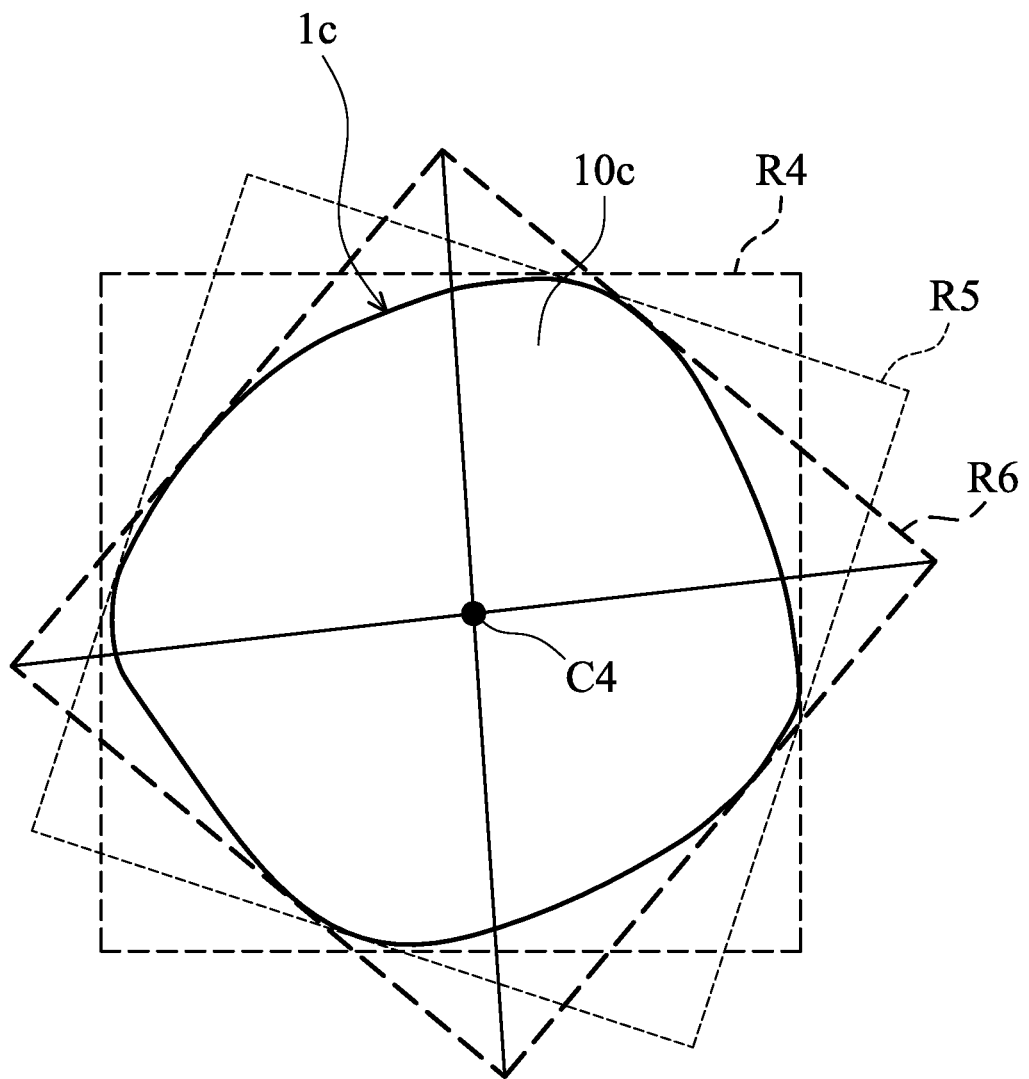
FIG. 10 is a schematic diagram showing the display panel in accordance with some embodiments of the present disclosure.

Referring to FIG. 10, a suitable number of cutting rulers may be disposed on the irregular shaped display panel 1c according to the above method such that the substrate 10c can meet the standard after cutting. The center of the substrate C4 of the substrate 10c of the display panel 1c may be determined by the following method. First, set three rectangles, which are tangential to the substrate edge, surrounding the substrate 10c, such as rectangle R4, rectangle R5 and rectangle R6. Next, compare the areas of rectangle R4, rectangle R5 and rectangle R6. The intersection of the diagonals of the rectangle having the smallest area will be the center of the substrate C4. It should be understood that since no axis of symmetry exists in this embodiment, the unit angle α is determined by the following method. The value of the unit angle α equals to $\tan^{-1}(A/B)$, wherein A is the width of rectangle R6, and B is the length of rectangle R6. If rectangle R6 is a square, A equals to B. The above method describes a rather rough way to select a center of the substrate. When the center of the substrate should be precisely determined, the following method may be used. First, set numerous rectangles surrounding the substrate 10c. Next, compare the areas of the rectangles and choose the one with the smallest area. The intersection of the diagonals of the rectangle having the smallest area will be the center of the substrate. In this way, the angle of each curved edge with respect to the center of the substrate can be determined. Select the suitable formula according to the types of cutting panel (one-cut cutting operation panel or multi-cut cutting operation panel). As a result, the maximum number of cutting rulers may be calculated.

In accordance with some embodiments of the present disclosure, the cutting rulers are used to make sure that the substrate of the display panel can meet the desired standard after the cutting process. The numbers of the disposed cutting rulers are determined according to the accuracy requirements and the shape of the display panel to meet various needs and improve productivity and product yield without increasing manufacturing cost.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A display panel, comprising:
a first substrate including a non-display area and a border surrounding the non-display area, wherein the border includes N curved edges and M straight edges, and one of the N curved edges connects to one of the M straight edges; and Num cutting rulers disposed adjacent to the border; wherein N, M, and Num satisfy the following equation:

$$N + M \leq Num \leq N + 2M + \sum_{1 \to N}\left[\left(\frac{\theta_n}{\tan^{-1}\left(\frac{A}{B}\right)}\right) + 1\right] + V$$

wherein Num, N and M are positive integers; V is a number of inflection points on the border, and V is 0 or a positive integer; A is the maximum length of the first substrate measured along a first direction; B is the maximum length of the first substrate measured along a second direction that is perpendicular to the first direction; A and B respectively represent a length of two adjacent sides of a rectangle which encompasses the border of the first substrate; two diagonals of the rectangle crosses at a center of the first substrate; and $\theta_n$ is an angle formed by connecting two endpoints of an $N_{th}$ curved edge to the center of the first substrate.

2. The display panel as claimed in claim 1, wherein the first direction is parallel to an axis of symmetry of the first substrate.

3. The display panel as claimed in claim 1, wherein each of the Num cutting rulers includes a plurality of straight segments arranged at predetermined intervals.

4. The display panel as claimed in claim 3, further comprising a scale value marked beside one of the plurality of straight segments.

5. The display panel as claimed in claim 3, wherein the Num cutting rulers comprise:
a first cutting ruler disposed adjacent to one of the N curved edges, the first cutting ruler including a first straight segment farthest from the one of the N curved edges; and
a second cutting ruler disposed on one of the M straight edges, the second cutting ruler including a second straight segment farthest from the one of the M straight edges;
wherein a minimum distance between the first straight segment and the one of the N curved edges is defined as a first distance, a minimum distance between the second straight segment and the one of the M straight edges is defined as a second distance, and the first distance is less than the second distance.

6. The display panel as claimed in claim 1, wherein the first substrate further includes a display area and a plurality of display elements, wherein the plurality of display elements are disposed on the display area, and the display area is adjacent to the non-display area.

7. The display panel as claimed in claim 1, further comprising a second substrate and a display layer, wherein the second substrate is disposed opposite to the first substrate, and the display layer is disposed between the first substrate and the second substrate.

8. A display panel, comprising:
a first substrate including a non-display area and a border surrounding the non-display area, wherein the border includes N curved edges and M straight edges, and one of the M straight edges does not connect to any of the N curved edges;
Num cutting rulers disposed adjacent to the border;
wherein the N, M, and Num satisfy the following equation:

$$2M - 1 \leq Num \leq N + 2M + \sum_{1 \to N}\left[\left(\frac{\theta_n}{\tan^{-1}\left(\frac{A}{B}\right)}\right) + 1\right] + V$$

wherein Num and N are positive integers; M is a positive integer greater than 3; V is a number of inflection points on the border, and V is 0 or a positive integer; A is the maximum length of the first substrate measured along a first direction; B is the maximum length of the first substrate measured along a second direction that is perpendicular to the first direction; A and B respectively represent a length of two adjacent sides of a rectangle which encompasses the border of the first substrate; two diagonals of the rectangle crosses at a center of the first substrate; and $\theta_n$ is an angle formed by connecting two endpoints of an $N_{th}$ curved edge to the center of the first substrate.

9. The display panel as claimed in claim 8, wherein the first direction is parallel to an axis of symmetry of the first substrate.

10. The display panel as claimed in claim 8, wherein each of the Num cutting rulers includes a plurality of straight segments arranged at predetermined intervals.

11. The display panel as claimed in claim 10, further comprising a scale value marked beside one of the plurality of straight segments.

12. The display panel as claimed in claim 11, wherein the Num cutting rulers comprise:
a first cutting ruler disposed adjacent to one of the N curved edges, the first cutting ruler including a first straight segment farthest from the one of the N curved edges; and
a second cutting ruler disposed adjacent to one of the M straight edges, the second cutting ruler including a second straight segment farthest from the one of the M straight edges;
wherein a minimum distance between the first straight segment and the one of the N curved edges is defined as a first distance, a minimum distance between the second straight segment and the one of the M straight edges is defined as a second distance, and the first distance is less than the second distance.

13. The display panel as claimed in claim 8, wherein the first substrate further includes a display area and a plurality of display elements, wherein the plurality of display elements are disposed on the display area, and the display area is adjacent to the non-display area.

14. The display panel as claimed in claim 8, further comprising a second substrate and a display layer, wherein the second substrate is disposed opposite to the first substrate, and the display layer is disposed between the first substrate and the second substrate.

15. A display panel, comprising:
a first substrate including a non-display area and a border surrounding the non-display area, wherein the border includes N curved edges; Num cutting rulers disposed adjacent to the border;
wherein N and Num satisfy the following equation:

$$N \leq Num \leq N + \sum_{1 \to N}\left[\left(\frac{\theta_n}{\tan^{-1}\left(\frac{A}{B}\right)}\right) + 1\right] + V$$

wherein Num and N are positive integers; V is a number of inflection points on the border, and V is 0 or a positive integer; A is the maximum length of the first substrate measured along a first direction; B is the maximum length of the first substrate measured along a second direction that is perpendicular to the first direction; A and B respectively represent a length of two adjacent sides of a rectangle which encompasses the border of the first substrate; two diagonals of the rectangle crosses at a center of the first substrate; and θn is an angle formed by connecting two endpoints of an $N_{th}$ curved edge to the center of the first substrate.

16. The display panel as claimed in claim 15, wherein the first direction is parallel to an axis of symmetry of the first substrate.

17. The display panel as claimed in claim 15, wherein each cutting ruler includes a plurality of straight segments arranged at predetermined intervals.

18. The display panel as claimed in claim 17, further comprising a scale value marked beside one of the plurality of straight segments.

19. The display panel as claimed in claim 15, wherein the first substrate further includes a display area and a plurality of display elements, wherein the plurality of display elements are disposed on the display area, and the display area is adjacent to the non-display area.

20. The display panel as claimed in claim 15, further comprising a second substrate and a display layer, wherein the second substrate is disposed opposite to the first substrate, and the display layer is disposed between the first substrate and the second substrate.

* * * * *